(12) United States Patent
Ohzawa et al.

(10) Patent No.: US 7,286,302 B2
(45) Date of Patent: Oct. 23, 2007

(54) OPTICAL SYSTEM, IMAGE PICKUP DEVICE AND DIGITAL APPARATUS

(75) Inventors: Soh Ohzawa, Toyonaka (JP); Keiji Matsusaka, Osaka (JP)

(73) Assignee: Konica Minolta Opto, Inc., Hachioji-Shi (JP)

(*) Notice: Subject to any disclaimer, the term of this patent is extended or adjusted under 35 U.S.C. 154(b) by 50 days.

(21) Appl. No.: 11/254,526

(22) Filed: Oct. 20, 2005

(65) Prior Publication Data
US 2006/0087747 A1   Apr. 27, 2006

(30) Foreign Application Priority Data
Oct. 21, 2004   (JP)   ............... 2004-307082

(51) Int. Cl.
G02B 13/04   (2006.01)
G02B 13/18   (2006.01)

(52) U.S. Cl. .................... 359/749; 359/708

(58) Field of Classification Search ......... 359/749–753
See application file for complete search history.

(56) References Cited
U.S. PATENT DOCUMENTS
5,999,337 A * 12/1999 Ozaki .................. 359/793
6,775,074 B2 * 8/2004 Kasahara ............ 359/781
6,833,967 B2 * 12/2004 Sekita ................. 359/770

FOREIGN PATENT DOCUMENTS
JP   5-264897 A   10/1993
JP   11-249009 A   9/1999
JP   2000-352665 A   12/2000

* cited by examiner

Primary Examiner—Jordan M. Schwartz
(74) Attorney, Agent, or Firm—Sidley Austin LLP

(57) ABSTRACT

A wide angle of view optical system, suitable for monitor cameras such as an in-vehicle camera and a security camera, having a reduced optical entire length and aberration correction for forming an optical image on light-receiving surfaces of an imaging element having a first lens having a negative optical power and a group of lenses each having a positive optical power, which are serially disposed from an object side. The first lens comprises at least one aspherical surface, and has a concave surface centered around an optical axis in vicinity of the optical axis on an image-side surface thereof. Further, an optical entire length T in millimeters (mm) of the entire system, a half angle of view θ, and a focal distance $f_{tot}$ of the entire system, also in millimeters, satisfy the conditional expressions.

19 Claims, 10 Drawing Sheets

Spherical Aberration

Astigmatism

Distortion Aberration

Spherical Aberration          Astigmatism          Distortion Aberration

Spherical Aberration
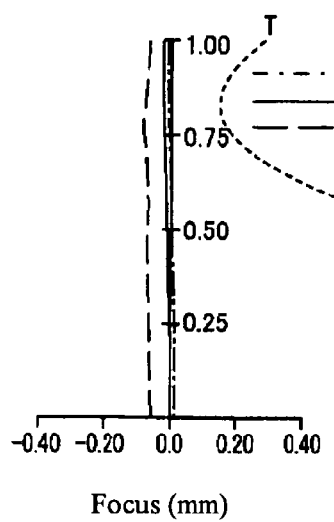
Astigmatism
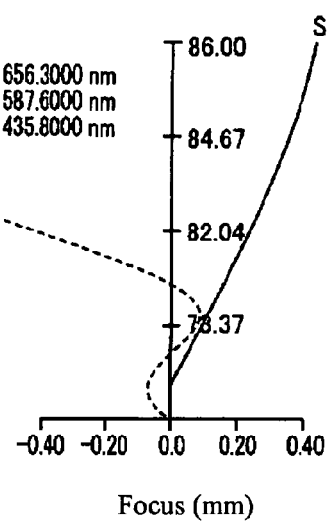
Distortion Aberration
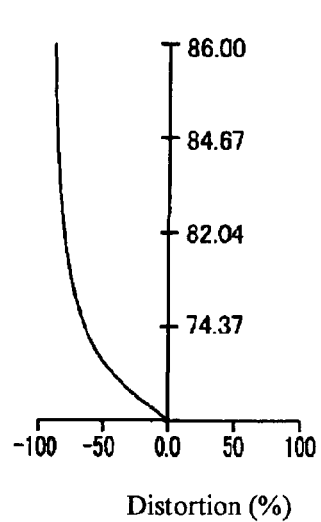
FIG. 10A  FIG. 10B  FIG. 10C

OPTICAL SYSTEM, IMAGE PICKUP DEVICE AND DIGITAL APPARATUS

The present application claims priority to Japanese Patent Application No. 2004-307082 filed on Oct. 21, 2004, the entire content of which is hereby incorporated by reference.

BACKGROUND OF THE INVENTION

1. Field of the Invention

The present invention relates to an optical system having a wide angle of view and a compact size, an image pickup device comprising the optical system and a digital apparatus comprising the image pickup device (for example, monitor cameras such as a security camera and an in-vehicle camera).

2. Description of the Related Art

When cameras having a wide angle of view in photographing are used, an image can be picked up in a wider range and with a fewer number of cameras. Therefore, a wide-angle optical system having a wide angle of view (wide angle lens) is preferably used as a lens installed in a security camera and an in-vehicle camera so that a wider photographing range can be obtained.

For example, the in-vehicle camera (used as a rear-view monitor installed in a vehicle or the like) is required not only to have the wide angle of view but also to have a compact size in view of such a practical aspect as not blocking a driver's view and such an aesthetical aspect as not undermining a design of the vehicle.

As an example of the wide-angle optical system, a wide-angle optical system comprising six components: a first lens group having a negative optical power; a second lens group having the negative optical power; a third lens group having a positive optical power; a fourth lens group having the negative optical power; a fifth lens group having the positive optical power; and a sixth lens group having the positive optical power, which are serially disposed from an object side, is recited in No. H05-264897, No. H11-249009 and No. 2000-352665 of the Publication of the Unexamined Japanese Patent Applications.

However, a maximum angle of view is such a small degree as approximately 60-65° and an entire optical length has such a lengthy dimension as at least 25 mm in the wide-angle optical systems recited in H05-264897.and No. H11-249009. In the wide-angle optical system recited in No. 2000-352665, the maximum angle of view exceeds 80°, however, a wider angle of view is desirably obtained when used as the monitor camera. Further, the wide-angle optical system recited in No. 2000-352665 has the entire optical length of such a lengthy dimension as approximately 25 mm in the same manner as in the wide-angle optical systems recited in H05-264897 and No. H11-249009, and is necessarily further downsized to be installed in digital apparatuses typified by the monitor camera such as the in-vehicle camera and a mobile telephone.

SUMMARY OF THE INVENTION

Therefore, a main object of the present invention is to provide an optical system reducing an optical entire length though having a wide angle of view.

Another object of the present invention is to provide an image pickup device capable of picking up an image in a wide range though having a compact size.

In order to achieve these and other objects, an optical system according to an aspect of the present invention comprises from an object side:

a first lens having a negative optical power, including at least an aspherical surface and having a concave surface centered around an optical axis in vicinity of the optical axis on an image-side surface; and a lens group having a positive optical power, wherein the following conditions are satisfied, $$10 \text{ mm} < T \times \sin\theta < 30 \text{ mm}$$

$$7 < T/f_{tot} < 20$$

Provided that,

T: optical entire length of entire system (mm)
θ: half angle of view
$f_{tot}$: focal distance of entire system (mm)

The invention itself, together with further objects and attendant advantages, will best be understood by reference to the following detailed description taken in conjunction with the accompanying drawings.

BRIEF DESCRIPTION OF THE DRAWINGS

FIGS. 10a through 10c are aberration charts respectively showing a spherical aberration, an astigmatic aberration and a distortion aberration in the wide-angle optical system according to the embodiment 3.

In the following description, like parts are designated by like reference numbers throughout the several drawings.

DETAILED DESCRIPTION OF PREFERRED EMBODIMENTS

Figure 1:
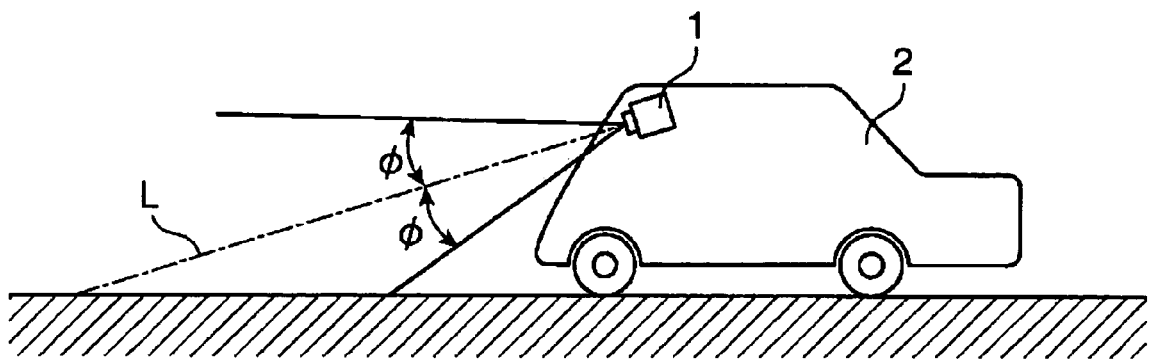
FIG. 1 is an illustration of an outline of an in-vehicle camera as an example of a camera to be installed in an optical system having a wide angle of view according to the present invention.

An optical system having a wide angle of view according to the present invention is, for example, suitably installed in an in-vehicle camera (an example of a monitor camera) 1 for picking up an image of a peripheral region of a vehicle body 2 as shown in FIG. 1. The in-vehicle camera 1 is installed, for example, at a predetermined position in the rear of the vehicle 2 so that a region in the rear of the vehicle 2 is photographed. A picked-up image of a photographic subject is displayed on a monitor disposed on, for example, a dashboard. The in-vehicle camera 1, which is not required to cover a visual field in an upper direction of the vehicle 2, is mounted in such a tilted manner that an optical axis L is directed obliquely downward. The in-vehicle camera 1 has an angle of field 2φ whose upper end is a horizontal line passing through a position at which the camera is mounted in a vertical direction. In this specification, an angle of field in a horizontal direction is also 2φ in the same manner as in the vertical direction, however, is not limited thereto. The angles of field in the vertical and horizontal directions may be different to each other.

Figure 2:
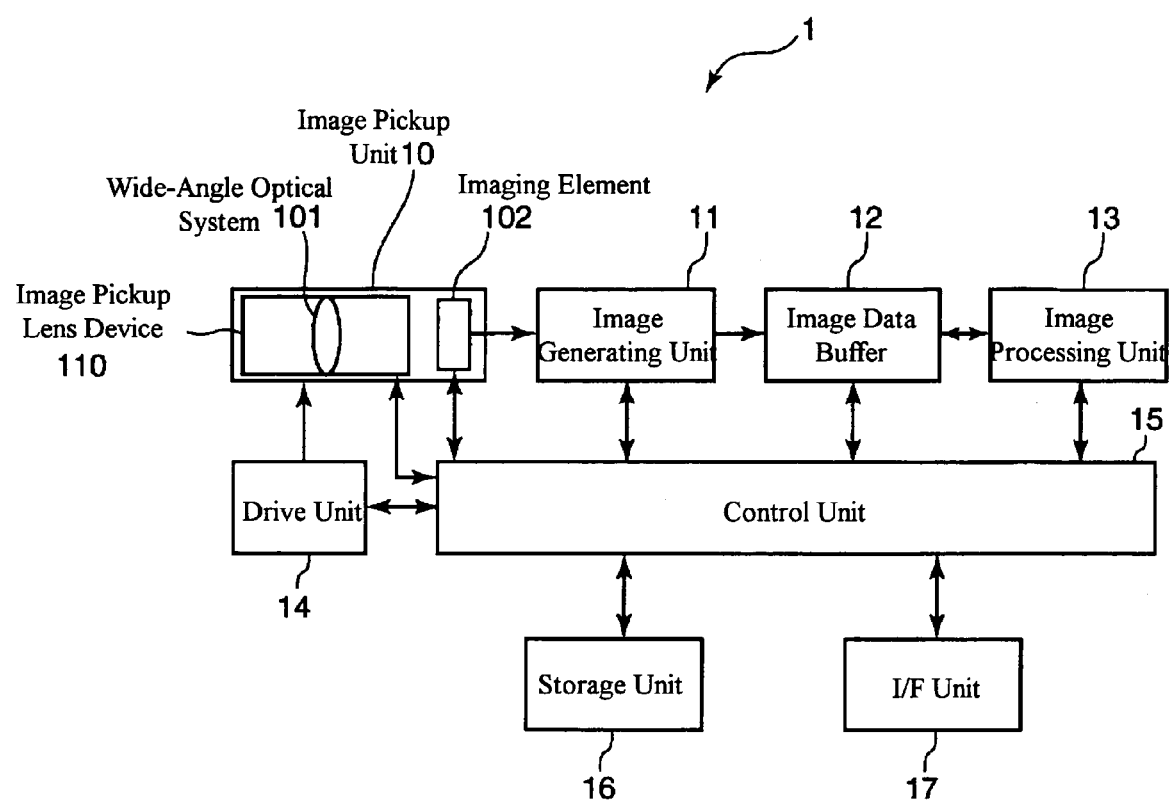
FIG. 2 is a functional block diagram illustrating a constitution of the in-vehicle camera as the example of the camera to be installed in the wide-angle optical system according to the present invention.

FIG. 2 is a functional block diagram illustrating a constitution of the in-vehicle camera as an example of the camera to be installed in the wide-angle optical system according to the present invention. In FIG. 2, the in-vehicle camera 1 comprises an image pickup unit 10, an image generating unit 11, an image data buffer 12, an image processing unit 13, a drive unit 14, a control unit 15, a storage unit 16, and an I/F unit 17.

The image pickup unit 10 comprises an image pickup lens device 110 and an imaging element 102. Between the image pickup lens device 110 and the imaging element 102 may be provided a parallel planar plate corresponding to an optical low pass filter or the like. The image pickup lens device 110 comprises a wide-angle optical system 101 and a lens drive mechanism for driving a lens in an optical-axis direction and focusing the lens, and the like. A light beam from the photographic subject is image-formed on an image pickup surface of the imaging element 102 by the wide-angle optical system 101 and formed into a light figure of the photographic subject.

The imaging element 102 is a photoelectric conversion element in which a plurality of light-receiving elements for converting a received light into an electrical signal in accordance with an intensity of the light is two-dimensionally disposed in, for example, a honeycomb shape, a matrix shape or the like. An example thereof is a CCD color area sensor in which color filters of R (red), G (green) and B (blue) are disposed at the rate of 1:2:1 on an image pickup surface of each photoelectric conversion element. The imaging element 102 converts the light figure of the photographic subject image-formed by the wide-angle optical system 101 into the electrical signals (image signals) of the color components of R (red), G (green) and B (blue) and outputs the electrical signals to the image generating unit 11 as the image signals of the colors of R (red), G (green) and B (blue). In the imaging element 102, image pickup operations, such as commencement and termination of an exposure operation and a read-out operation (horizontal synchronization, vertical synchronization and transfer) of the outputted signals of the respective pixels obtained by the imaging element 102, are controlled under the control of the control unit 15.

The imaging element 102 is not limited to the CCD type as described above and may be a solid imaging element of a CMOS type. Further, the imaging element 102 is not limited to the color imaging element, and may be a black and white imaging element.

The image generating unit 11 executes generally-known image processes such as decision of an appropriate black level in an entire image, y correction, white-balance adjustment, outline correction, and correction of irregular colors to thereby generate an image data of each pixel from the image signals. The image data generated in the image generating unit 11 is outputted to the image data buffer 12.

In the image data, a positional data representing a position of the pixel and a luminance data representing a luminance of the pixel are made to correspond to each other for each pixel. The luminance data comprises luminance values of the respective pixels when the in-vehicle camera 1 photographs the black and white image, while the luminance data comprises luminance values of the red component, green component and blue component in the respective pixels or luminance values and color-difference values when the in-vehicle camera 1 photographs the color image.

The image data buffer 12 temporarily memorizes the image data and is a memory used as a working region for processing the image data in the following manner in the image processing unit 13, an example of which is RAM or the like.

The image processing unit 13 is a circuit for executing image processes to the image data of the image data buffer 12, the image processes including a resolution conversion and a distortion correction by which a distorted image due to a distortion aberration is corrected into a natural image similar to a sight seen by a naked eye and hardly having any distortion. The drive unit 14 drives the optical axis L of the in-vehicle camera 1 in, for example, the horizontal (panning) direction or vertical (tilting) direction using a control signal outputted from the control unit 15.

The storage unit 16 is a memory circuit for storing various programs required for the operation of the in-vehicle camera 1, a data necessary for executing the programs and a data generated during the execution of the programs, and comprises, for example, ROM or RAM. The I/F unit 17 is an interface for transmitting/receiving the image data with respect to an external apparatus, and conforms to such standards as USB and IEEE1394.

The control unit 15 comprises, for example, a microprocessor or the like, and controls the image pickup unit 10, image generating unit 11, image data buffer 12, image processing unit 13, drive unit 14, storage unit 16 and I/F unit 17.

The distortion correction, panning, tilting mechanism, focusing mechanism and the like in the image processes may be omitted if necessary.

A process flow when the in-vehicle camera 1 constituted as above is used as a rear-view monitor is described below. A driver (user) drives the vehicle body 2 backward watching the monitor disposed on, for example, the dashboard of the vehicle body 2. At that time, the driver carries out a predetermined operation such as pressing buttons provided on the dashboard if a region that the driver desires to confirm does not coincide with a region picked up by the in-vehicle camera 1.

In response to the foregoing operation, the control unit 15 controls the drive unit 14 to thereby adjust a direction of the image pickup unit 10. Then, the control unit 15 drives a lens drive mechanism of the image pickup lens device 110 to thereby focus a lens. Thereby, a focused optical image is image-formed on the light-receiving surfaces of the imaging element 102 and converted into the image signals of the color components of R, G and B, and then outputted to the image generating unit 11. The image signals are temporarily memorized in the image data buffer 12 and subjected to the image processes executed in the image processing unit 13. In the foregoing manner, the natural image in the region that the drive desires to confirm is displayed on the monitor disposed on the dashboard.

In the foregoing description, the in-vehicle camera was described as the example of the camera to be installed in the wide-angle optical system according to the present invention, however, the present invention is not limited thereto. The wide-angle optical system according to the present invention can be applied to the monitor camera, digital apparatus and the like. Examples of the digital apparatus include a mobile telephone, mobile information terminal (PDA: Personal Digital Assistant), personal computer, mobile computer peripheral devices thereof and the like.

Figures 3A, 3B:
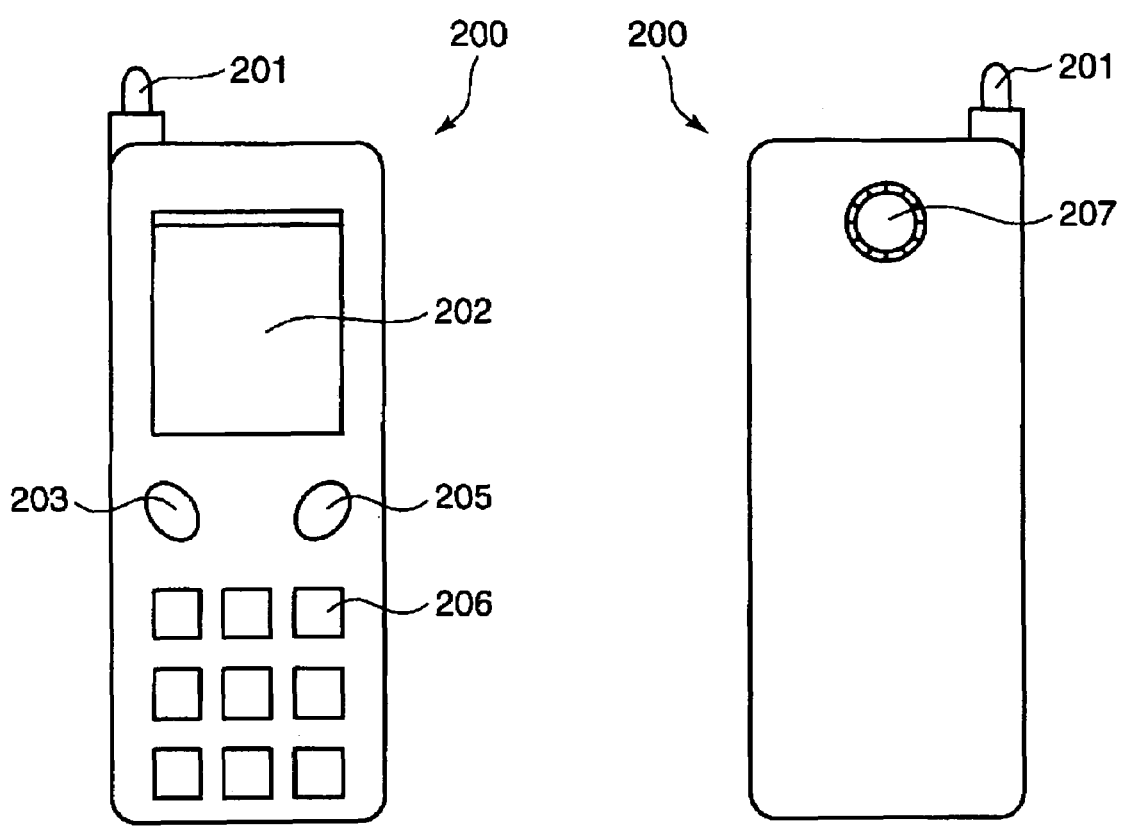
FIG. 3a is a view of an external appearance of a camera-incorporated mobile telephone in which the wide-angle optical system according to the present invention is installed, wherein an operation surface thereof is shown.
FIG. 3b is a view of the external appearance of the camera-incorporated mobile telephone in which the wide-angle optical system according to the present invention is installed, wherein a rear surface of the operation surface is shown.

FIG. 3 show an external appearance of a camera-incorporated mobile telephone as an example of the digital apparatus according to the present invention, wherein FIG. 3a shows an operation surface of the mobile telephone, and FIG. 3b shows a rear surface of the operation surface. A main body 200 of the mobile telephone comprises an antenna 201 at an upper part thereof, a display 202 on the operation surface thereof, an image switching button 203 for switching to and from activation of an image photographing mode and still image photographing/moving image photographing modes, a shutter button 205 and dialing buttons 206. Further, the main body 200 of the mobile telephone incorporates an image pickup device (camera) 207 including the wide-angle optical system according to the present invention, and a photographing lens is exposed on the rear surface.

When a still image is photographed, the image switching button 203 is pressed so that the still image photographing mode is activated. In the description here, the still image photographing mode is activated when the image switching button 203 is pressed once, and the still image photographing mode is switched to the moving image photographing mode when the switching button 203 is subsequently pressed once more. To be specific, the control unit of the main body 200 of the mobile telephone has a function of making the imaging element execute at least one of the still image photographing and the moving image photographing with respect to the photographic subject on the object side in response to the receipt of the instruction from the image switching button 203.

When the still image photographing mode is activated, the image of the photographic subject is periodically photographed a number of times by the imaging element such as CCD via the photographing lens and transferred to a display memory, and then led to the display 202. The user looked into the display 202 to thereby adjust a position of the main photographic subject to stay at a desired position in a screen. Then, the shutter button 205 is subsequently pressed, and the still image can be thereby obtained. The image data is stored in a still-image memory.

When a moving image is photographed, the image switching button 203 is pressed once so as to activate the still image photographing mode and pressed once again so as to shift to the moving image photographing mode. Thereafter, the user looked into the display 202 to thereby adjust the position of the image of the photographic subject obtained via the image pickup device 207 to stay at a desired position in the screen in the same manner as in the still image photographing. When the shutter button 205 is pressed in the foregoing state, the moving image is photographed. Then, the shutter button 205 is pressed once again, the moving image photographing is terminated. The moving image is led to the display memory for the display 202, and led to and stored in a moving-image memory.

Below is described the wide-angle optical system 101 constituting the image pickup lens device 110 of the in-vehicle camera 1 shown in FIG. 2 and the wide-angle optical system constituting the image pickup device 207 of the main body 200 of the mobile telephone shown in FIG. 3 are described referring to the drawings.

Throughout the present description, an optical power (refracting power) of a single lens and each of single lenses constituting a cemented lens indicates a power when both sides of a lens surface of the single lens includes an interface with air, that is when the single lens is independently present. In the description below, a lens having a positive optical power is called a positive lens, while a lens having a negative power is called a negative lens.

Embodiment 1

Figure 4:
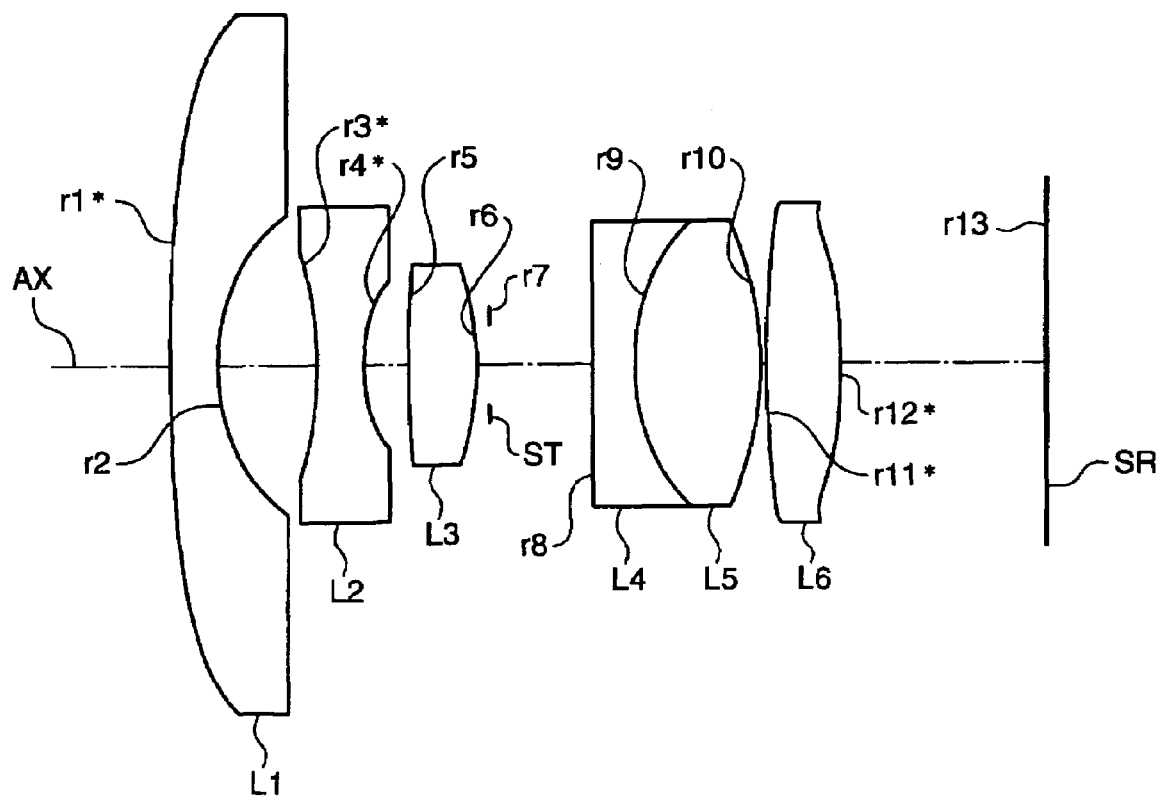
FIG. 4 is a sectional view of an optical system having a wide angle of view according to an embodiment 1 of the present invention longitudinally taken along an optical axis thereof.

FIG. 4 is a sectional view longitudinally taken along an optical axis (AX), wherein an array of lenses in a wide-angle optical system according to an embodiment 1 of the present invention is shown. In the present embodiment, these lenses comprise, in the order from the object side in FIG. 4 (left side in FIG. 4), a first lens having a negative optical power (L1) and a lens group having a positive optical power on the whole (L2-L6). In the following embodiments, an optical stop (ST) for adjusting a light amount is interposed between the third lens (L3) and the fourth lens (L4), and an imaging element (SR) is disposed on an image side of the sixth lens (L6) that is the closest to the image side.

In the description below, terms, that are "concave", "convex" and "meniscus", are used in describing the lens, however, the terms describe, not a shape of the entire lens or a part close to an end of the lens, but a shape of the lens surface in vicinity of the optical axis (around the center of the lens). The foregoing point mentioned above is not an issue to be regarded in the case of a spherical lens, however, is to be noted in the case of an aspherical lens having different shapes at the center of the lens and a part closer to an end thereof.

The wide-angle optical system according to the embodiment 1 shown in FIG. 4, comprises the following lenses in the order from the object side. The first lens (L1) having the negative optical power is a negative meniscus lens that is convex on the object side, the second lens (L2) is a negative lens that is concave on the object and image sides, the third lens (L3) is a positive lens that is convex on the both sides, the fourth lens (L4) is the negative lens that is concave on the both sides, the fifth lens (L5) is the positive lens that is convex on the both sides, and the sixth lens (L6) is the positive lens that is convex on the both sides. The fourth lens (L4) and the fifth lens (L5) constitute the cemented lens fixedly integrated.

In the cemented lens, a precision in cementing the lenses, instead of a mechanical precision of a support member for supporting the lenses, can be maintained. Therefore, the cemented lens does not deteriorate over time in such manner that the optical axis is shifted between the lenses that are cemented in spite of a long-term use, and can be easily optically adjusted. As further advantages, when the lenses are cemented, an error sensitivity generated from an eccentricity can be reduced, and the absence of any gap between the lens surfaces because the lenses are cemented allows any unnecessary inter-surface reflected light to be controlled, resulting in the generation of a favorable optical image.

Referring to the number of the lenses in the cemented lens, the entire cemented lens is not counted as one, but the number of the single lenses constituting the cemented lens is referred to. For example, the number of the lenses in the cemented lens comprising three single lenses is not one but three.

A number ri (i=1, 2, 3, ...) shown in FIG. 4 denotes an ith lens surface counted from the object side (however, the cemented lens surfaces are counted as one), and any surface provided with the *-attached ri is the aspherical surface.

In the foregoing constitution, the incident light beam from the object side in the drawing transmits through the first through sixth lenses (L1-L6) in that order and forms the optical image of the photographic subject on the light-receiving surfaces of the imaging element (SR). At that time, a parallel planar plate (PL) may be disposed between the sixth lens (L6) and the imaging element (SR). When the plate is disposed, the optical image is corrected in such manner a generally-called aliasing noise generated when the optical image is converted into the electrical signal in the imaging element (SR) is minimized. The parallel planar plate (PL) corresponds to an optical low pass filter, an infrared-ray cut filter, a cover glass of the imaging element and the like.

The optical image is finally converted into the electrical signal in the imaging element (SR). The electrical signal is subjected to a predetermined digital image processing, an image compression and the like when necessary, and recorded in a memory incorporated in the in-vehicle camera 1 as a digital video signal.

Lens formations according to embodiments 2 and 3 of the present invention are described below referring to the drawings in the same manner as in the embodiment 1. Reference symbols shown in FIGS. 5 and 6 denote the same components as in FIG. 4.

Embodiment 2

Figure 5:
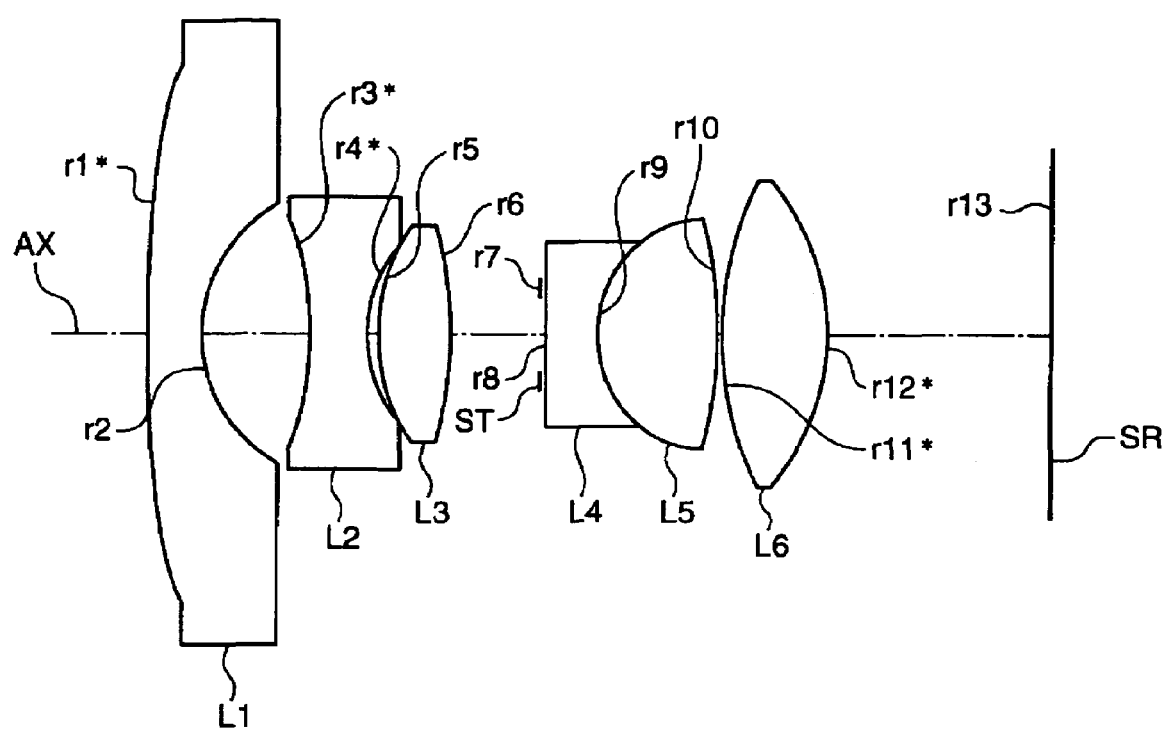
FIG. 5 is a sectional view of an optical system having a wide angle of view according to an embodiment 2 of the present invention longitudinally taken along an optical axis thereof.

FIG. 5 is a sectional view longitudinally taken along an optical axis (AX), wherein an array of lenses in a wide-angle optical system according to an embodiment 2 of the present invention is shown. The wide-angle optical system according to the embodiment 2 comprises the following lenses in the order from the object side. The first lens (L1) having the negative optical power is the negative lens that is concave on the object and image sides, the second lens (L2) is the negative lens that is concave on the both sides, the third lens (L3) is the positive lens that is convex on the both sides, the fourth lens (L4) is the negative lens that is concave on the both sides, the fifth lens (L5) is the positive lens that is convex on the both sides, and the sixth lens (L6) is the positive lens that is convex on the both sides. The fourth lens (L4) and the fifth lens (L5) constitute the cemented lens fixedly integrated.

Embodiment 3

Figure 6:
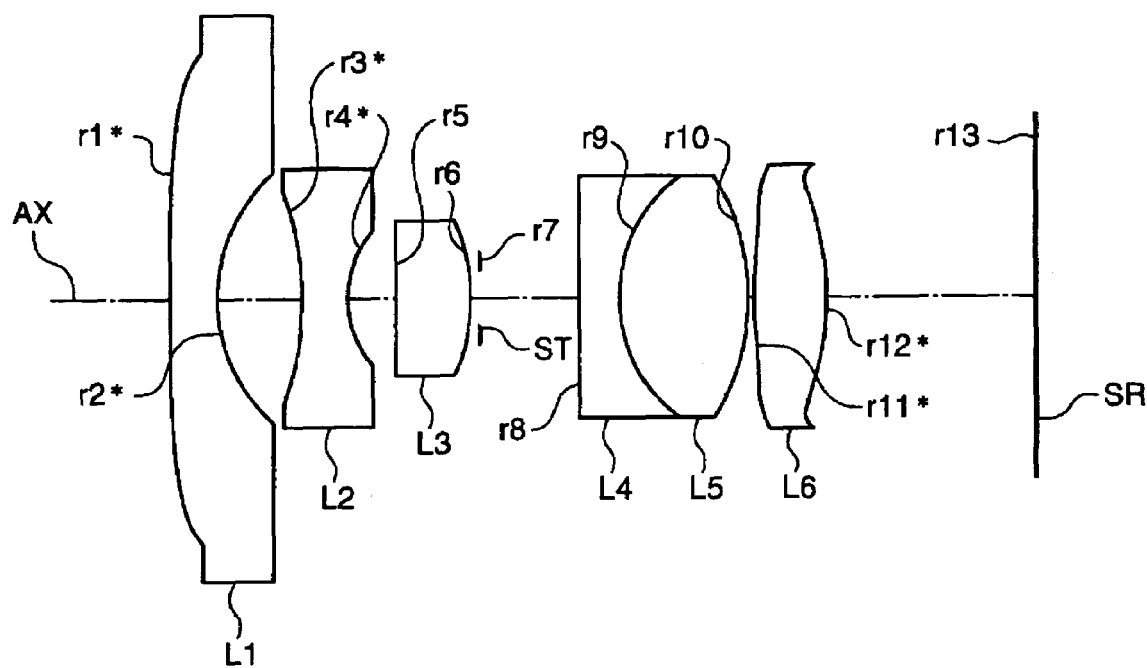
FIG. 6 is a sectional view of an optical system having a wide angle of view according to an embodiment 3 of the present invention longitudinally taken along an optical axis thereof.

FIG. 6 is a sectional view longitudinally taken along an optical axis (AX), wherein an array of lenses in a wide-angle optical system according to an embodiment 3 of the present invention is shown. The wide-angle optical system according to the embodiment 3 comprises the following lenses in the order from the object side. The first lens (L1) having the negative optical power is the negative lens that is concave on the object and image sides, the second lens (L2) is the negative lens that is concave on the both sides, the third lens (L3) is the positive meniscus lens that is convex on the image side, the fourth lens (L4) is the negative lens that is concave on the both sides, the fifth lens (L5) is the positive lens that is convex on the both sides, and the sixth lens (L6) is the positive lens that is convex on the both sides. The fourth lens (L4) and the fifth lens (L5) constitute the cemented lens fixedly integrated.

Hereinafter, desirable conditions for the optical system according to the present invention are described in sequence.

The optical system comprising, in the order from the object side, the first lens having the negative optical power, including at least one aspherical surface and having the concave surface centered around the optical axis in the vicinity of the optical axis on the image-side surface and the lens group having the positive optical power desirably satisfies the following conditional expressions (1) and (2).

$$10 \text{ mm} < T \times \sin \theta < 30 \text{ mm} \quad (1)$$

$$7 < T/f_{tot} < 20 \quad (2)$$

Provided that
T: optical entire length of entire system (mm)
θ: half angle of view
$f_{tot}$: focal distance of entire system (mm)

The foregoing constitution provides a negative-lead structure in which the first lens that is the closest to the object side has the negative optical power. Therefore, the light beam entering from the object side in a wide angle can be immediately moderated by the negative optical power of the first lens. In the negative-lead structure, downsizing does not impact a capability of controlling the increase of the error sensitivity.

In addition to the advantage of the negative-lead structure, the light beam entering from the object side in the wide angle can be more effectively moderated because the image-side surface of the first lens is concave. Further, various aberrations can be effectively controlled because the first lens comprises the aspherical surface.

In the case of falling below the lower limit of the conditional expression (1), it becomes difficult to correct a distortion on the image surface and astigmatic aberration generated from the reduction of the optical entire length and the increase of the optical powers of the respective lenses. In contrast, in the case of exceeding the upper limit of the conditional expression (1), the optical entire length is increased, thereby resulting in an increase in size.

Further, it is desirable to satisfy the following conditional expression (1)'.

$$14 \text{ mm} < T \times \sin \theta < 22 \text{ mm} \quad (1)'$$

The foregoing conditional expression (1)' is desirably satisfied because the optical powers required for the respective lenses are increased and the error sensitivity of the lenses is increased due to the reduction of the optical entire length in the case of falling below the lower limit of the conditional expression (1). As an unfavorable result generated therefrom, a manufacturing process becomes more difficult, which leads to a cost increase in mass production. In contrast, the optical entire length is increased in the case of exceeding the upper limit of the conditional expression (1)'. Accordingly, it becomes necessary to increase a diameter of the first lens in order to maintain a wide angle. As a result, a size of the optical unit in a radial direction is increased.

In the case of falling below the lower limit of the conditional expression (2), the optical entire length becomes too short for a focal distance, which increases the optical powers of the respective lenses. As a result, the image-surface distortion and astigmatic aberration cannot be easily corrected and the wide angle cannot be obtained. In contrast, the optical entire length is increased resulting in an increased size in the case of exceeding the upper limit of the conditional expression (2).

Further, it is desirable to satisfy the following conditional expression (2)'.

$$9 < T/f_{tot} < 15 \quad (2)'$$

In the case of falling below the lower limit of the conditional expression (2)', a degree of retrofocus is reduced, and an incident angle of the light beam with respect to the imaging element is increased. This results in the generation of the problem that a peripheral illuminance drops in the case of using CCD or the like as the imaging element. In contrast to that, the optical entire length is increased in the case of exceeding the upper limit of the conditional expression (2)'. Accordingly, it becomes necessary to increase the diameter of the first lens in order to maintain the wide angle. Then, the radial size of the optical unit is increased.

Further, it is desirable to satisfy the following conditional expression (3).

$$350 < Hk_1 \quad (3)$$

Provided that, $Hk_1$: Knoop hardness of first lens

The Knoop hardness (Hk) is obtained by a quotient resulting from the division of a load when a surface as a test object (glass surface) is indented using a diamond square spindle indenting tool having a rhomboidal sectional surface and vertically opposite angles of 172° 30' and 130° by a projection area obtained from a length of a longer diagonal line of a permanent indentation.

In the case of falling below the lower limit of the conditional expression (3), the first lens easily undergoes flaws because the hardness of the first lens is insufficient, which results in the risks that a flare is generated due to the flaws and a performance in the image pickup is deteriorated. When the conditional expression (3) is satisfied, it may become unnecessary to make such an arrangement for preventing any flaw from being generated as additionally covering the surface of the first lens on the photographic-subject side with a cover glass or the like.

Further, it is more desirable to satisfy the following conditional expression (3)', and it is the most desirable to satisfy the following conditional expression (3)".

$$450 < Hk_1 \quad (3)'$$

$$600 < Hk_1 \quad (3)''$$

When the conditional expressions (3)' and (3)" are satisfied, the hardness of the first lens is increased, and the lens surface closest to the object side is hardly damaged when used in severe circumstances such as the in-vehicle use. Therefore, the flare generation resulting from the flaws and the deterioration of the image-pickup performance can be controlled.

Further, it is desirable to satisfy the following conditional expression (4).

$$-0.6 < f_1/f_{tot} < -0.2 \quad (4)$$

provided that, $f_1$: focal distance of first lens (mm)

In the case of falling below the lower limit of the conditional expression (4), the negative optical power of the first lens is weakened. As a result, an off-axis light entering in a wide angle from the object side cannot be effectively moderated in the direction of the imaging element. Therefore, it becomes necessary to increase the diameter of the first lens or the optical entire length in order to effectively lead the off-axis light to the imaging element. In contrast, the negative optical power of the first lens is intensified in the case of exceeding the upper limit of the conditional expression (4), which makes it difficult to correct the image-surface distortion generated in the first lens.

Further, it is desirable that the first lens comprise the aspherical surface as the object-side surface and a periphery of the aspherical surface has the positive optical power larger than that of a central part thereof.

According to the foregoing constitution, the peripheral part of the object-side surface of the first lens has the large positive optical power. Then, the off-axis light entering the peripheral part in the wide angle can be effectively moderated in the direction of the imaging element. As a result, the optical system capable of reducing the image-surface distortion and astigmatic aberration generated on the object-side surface and having a wide angle of view can be realized.

The first lens desirably satisfies the following conditional expressions (5) and (6).

$$30 < v_1 \quad (5)$$

$$1.6 < N_1 \quad (6)$$

provided that, $v_1$: dispersion of first lens $N_1$: refractive index of first lens In the case of falling below the lower limit of the conditional expression (5), a magnification chromatic aberration generated in the first lens is increased, which makes it difficult to correct the aberration using another lens. In the case of falling below the lower limit of the conditional expression (6), a Petzval sum generated in the first lens is increased, which makes it difficult to correct the image-surface distortion.

Further, the aspherical surface of the lens that is the closest to the object side desirably satisfies the following conditional expression (7).

$$3.0 \times 10^{-2} < D/f_{tot} < 3.0 \times 10^{-1} \quad (7)$$

provided that,

D: shift amount (direction where the positive power is intensified is positive, unit: mm) of the aspherical surface from a reference curved surface (spherical surface) at a position through which a principal ray having an image height of 80% of a maximum image height (H) is transmitted in the light-receiving surfaces of the imaging element.

Figure 7:
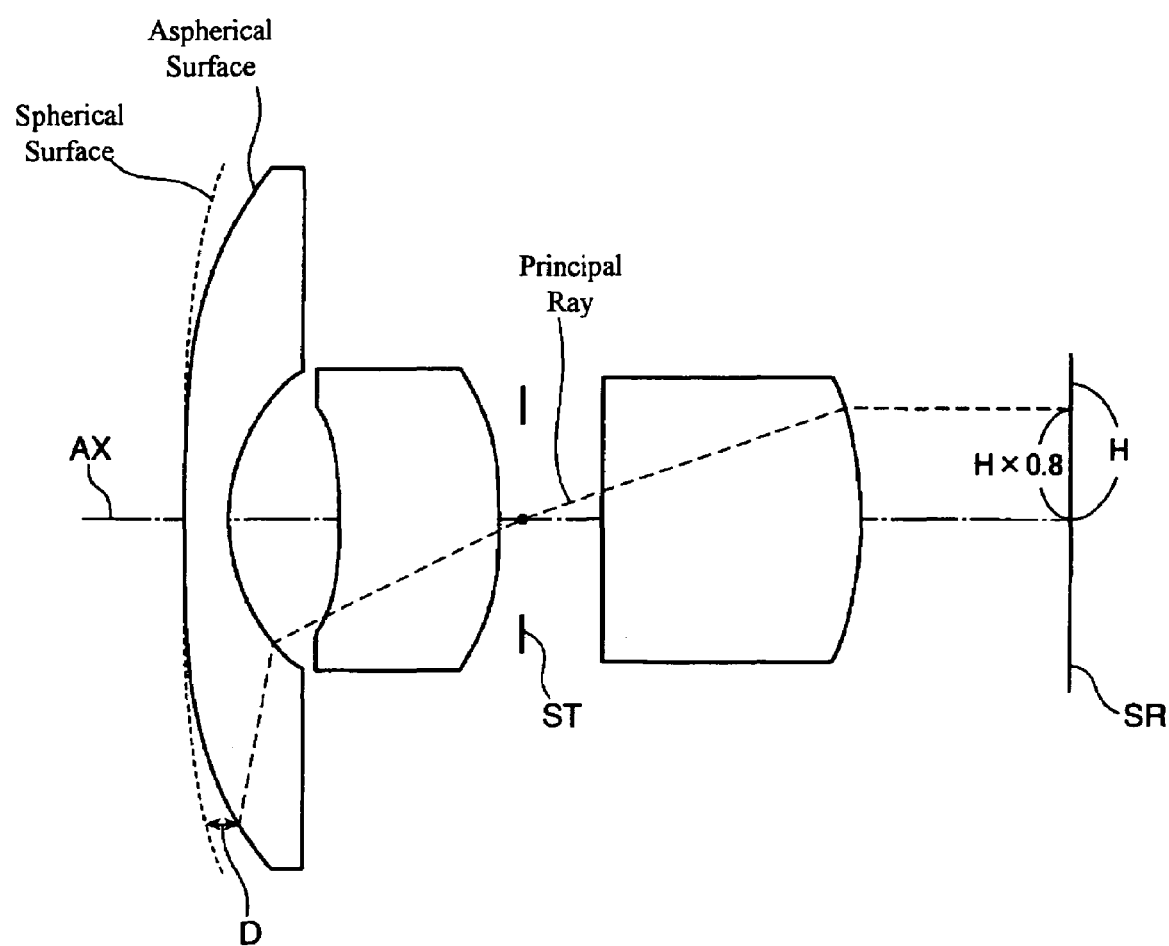
FIG. 7 shows a definition of a shift amount of an aspherical surface from a reference curved surface at a position having an image height of a maximum image height×0.8 in a lens that is the closest to an object side through which a principal ray is transmitted.

The definition of D is shown in FIG. 7. More specifically, the shift amount D denotes a length in the optical-axis direction by which the principal ray (light beam transmitting though the center of the optical stop) among the light beams image-formed at the position of 80% of the maximum height (H) in the light-receiving surface of the imaging element is shifted from the spherical surface in the lens surface that is the closest to the object side.

In the case of falling below the lower limit of the conditional expression (7), it becomes impossible to completely correct the image-surface distortion generated in the first lens having the negative power in the aspherical surface, which deteriorates the performance of the entire lenses. In contrast, the image-surface distortion generated in the first lens having the negative power is excessively corrected in the aspherical surface in the case of exceeding the upper limit of the conditional expression (7), which also deteriorates the performance of the entire lenses.

The lens surface of the first lens on the object side is desirably aspherical because the image-surface distortion, which is a problem in the wide-angle optical system, can be effectively corrected in the lens surface that is the closest to the object side where the lights of the respective image heights are separated from one another more than in any other lens surface.

Further, one of the surfaces of the first lens is desirably aspherical, while the other is desirably spherical. Thereby, a burden of processing molds required for manufacturing the lenses is reduced, and further, the number of the aspherical surfaces, which is hard to be evaluated, can be reduced. Therefore, the manufacturing cost of the first lens can be curtailed.

When the image-side surface of the first lens is the aspherical surface of a compound type, the first lens can have the aspherical surface without undermining a durability of the lens. The lens having the compound-type aspherical surface is a lens in which a spherical glass material used as a substrate is coated with a thin resin material so as to have the aspherical shape.

Further, in the wide-angle optical system, the maximum angle of view is desirably at least 120°. Thereby, a wide range can be photographed with one camera, which is the most suitable for the monitoring use and the in-vehicle use.

Further, in the wide-angle optical system, it is desirable to dispose the aspherical-surface lens closer to the image-surface side than the optical stop so that the aspherical surface can be disposed at a position largely different to the position through which the light beam is transmitted in the first lens. Thereby, a degree of freedom in correcting the aberration is increased, thereby improving the performance.

Further, in the wide-angle optical system, the lens that is the closest to the image surface desirably has the aspherical surface. Thereby, the position through which the off-axis light is transmitted in the lens that is the closest to the image-surface side can have different heights for the respective image heights. As a result, the image-surface distortion disadvantageously generated in the wide-angle optical system can be effectively corrected.

Further, in the wide-angle optical system, any aspherical lens other than the first lens is desirably made of resin because any lens other than the first lens hardly has a direct contact with outside and the resin lens thereby does not cause any problem in terms of durability. When all of the lenses except for the first lens are made of resin, the cost reduction can be achieved.

Further, the wide-angle optical system desirably comprises at least one positive lens and one negative lens made of resin. Thereby, when a temperature change is generated, any variation in the aberrations and lensback due to the temperature change can be cancelled. As a result, a range of environmental temperatures for the operation can be enlarged.

Further, an adhesive such as a UV-ray cured resin may be interposed between the lens surfaces when the lens surfaces of at least two lenses are adhered to each other.

In the embodiments describe so far, the first, second and sixth lenses (L1, L2 and L6) have the aspherical surface, however, the present invention is not limited thereto. The lenses other than the foregoing lenses may have the aspherical surface so that on-axis aberrations, and the spherical aberration, in particular, can be more effectively corrected.

Further, it is desirable for any lens surface comprising an interface with air to have the aspherical surface because the effect of the aspherical surface can be more effectively exerted. As a result, the downsizing and higher image quality can be both achieved.

Further, the lens having the aspheircal surface may be formed by means of molding, or may naturally be formed as the compound type using the glass and resin materials. The molded lens is suitable for the mass production, however, the usable glass materials are limited. On the other hand, the lens of the compound type can employ a variety of glass materials that can be used for the substrate, which allows a higher degree of freedom in design.

In the foregoing embodiments, a mechanical shutter having a function of intercepting the light with respect to the imaging element (SR) may be provided as the optical stop (ST). The mechanical shutter can effectively prevent a smear when the CCD system, for example, is used as the imaging element.

In the wide-angle optical systems according to the embodiments, the refractive lens for deflecting the incident light beam through a refractive effect (type of lens in which the deflection is performed in an interface between media each having a different refractive index), however, the usable lens is not limited to the refractive lens. For example, a diffractive lens for deflecting the incident light beam through a diffractive effect, a refractive/diffractive hybrid lens for deflecting the incident light beam by means of the combination of the diffractive and refractive effects, a lens of a gradient index type for deflecting the incident light beam through a refractive index distribution in the medium, or the like, may also be used. A luminous flux regulating plate or the like, other than the optical stop (ST), may be disposed if necessary.

Hereinafter, examples of the optical system according to the present invention are described in further detail referring to construction data, aberration charts and the like.

EXAMPLE 1

Tables 1 and 2 respectively show principal construction data of the respective lenses and coefficients of aspherical surfaces according to an example 1 (embodiment 1). In the present example, the second lens (L2) and the sixth lens (L6) are plastic lenses (lenses made of resin).

TABLE 1

| lens surface | curvature radius (mm) | axial distance (mm) | refractive index | dispersion |
|---|---|---|---|---|
| r1* | 87.889 | 1.000 | 1.713 | 53.933 |
| r2 | 3.000 | 1.987 | | |
| r3* | −7.275 | 1.000 | 1.525 | 56.341 |
| r4* | 2.236 | 0.894 | | |
| r5 | 18.156 | 1.429 | 1.799 | 22.600 |
| r6 | −4.166 | 0.401 | | |
| r7 | ∞ | 1.967 | | |
| r8 | −18.695 | 0.800 | 1.799 | 22.600 |
| r9 | 3.000 | 2.631 | 1.755 | 51.570 |
| r10 | −4.565 | 0.100 | | |
| r11* | 9.933 | 1.540 | 1.525 | 56.341 |

TABLE 1-continued

| lens surface | curvature radius (mm) | axial distance (mm) | refractive index | dispersion |
|---|---|---|---|---|
| r12* | −7.997 | 4.246 | | |
| r13 | ∞ | | | |

TABLE 2

| lens sur-face | conical coeffi-cient | aspherical coefficient | | | |
|---|---|---|---|---|---|
| | | A | B | C | D |
| r1* | 0 | 7.43E−04 | 4.48E−06 | 4.35E−16 | 5.48E−20 |
| r3* | 0 | −8.26E−03 | 1.64E−03 | −4.31E−05 | −5.86E−06 |
| r4* | 0 | −1.95E−02 | 1.29E−02 | −1.88E−03 | 0.00E+00 |
| r11* | 0 | −4.51E−03 | −2.26E−03 | 5.22E−04 | −2.17E−05 |
| r12* | 0 | −5.19E−03 | −7.66E−04 | 1.41E−04 | 1.22E−05 |

Table 1 shows, from the left, the number and curvature radius (unit: mm) of each lens surface, interval between the lens surfaces on the optical axis (axial distance/unit: mm), and refractive index and dispersion of each lens. The number ri of each lens (i=1, 2, 3, . . . ) is the ith lens surface from the object side, and the surface provided with the *-attached ri is aspherical in the same manner as in FIG. 4.

As is learnt from Table 1, the object-side surface of the first lens (L1), both surfaces of the second lens (L2) and both surfaces of the sixth lens (L6) are aspherical in the example 1. Because the optical stop (ST) and the light-receiving surfaces of the imaging element (SR) are planar, the curvature radiuses thereof are respectively ∞.

The aspherical surface of the lens is defined by the following expression using a local orthogonal coordinate system (x, y, z) in which a peak of the surface is a point of origin and a direction from the object toward the imaging element is a positive direction of a z axis.

[Expression]

$$z = \frac{c \cdot h^2}{1 + \sqrt{1 - (1+k)c^2 \cdot h^2}} + A \cdot h^4 + B \cdot h^6 + C \cdot h^8 + D \cdot h^{10}$$

provided that, z: displacement in the z-axis direction at a height h position (reference in the surface peak)

h: vertical height relative to the z axis ($h^2 = x^2 + y^2$)

c: paraxial curvature (=1/curvature radius)

A, B, C, D, E, F, G, H, J: aspherical-surface coefficient k: conical constant

As is learnt from the foregoing definition, the curvature radius relative to the aspherical-surface lens shown in Table 1 shows a value in vicinity of the center of the lens. In Table 2, for example, "E−01" denotes $10^{-1}$.

Figure 8A:
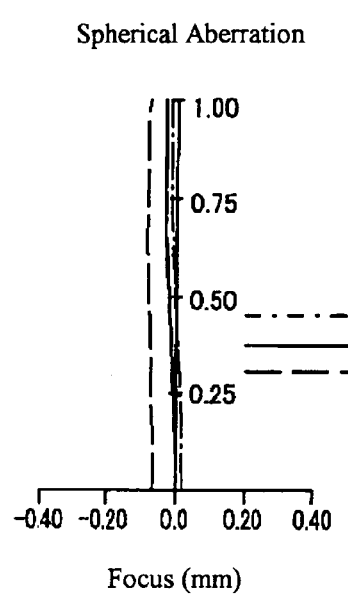
FIGS. 8a through 8c are aberration charts respectively showing a spherical aberration, an astigmatic aberration and a distortion aberration in the wide-angle optical system according to the embodiment 1.
Figure 8B:
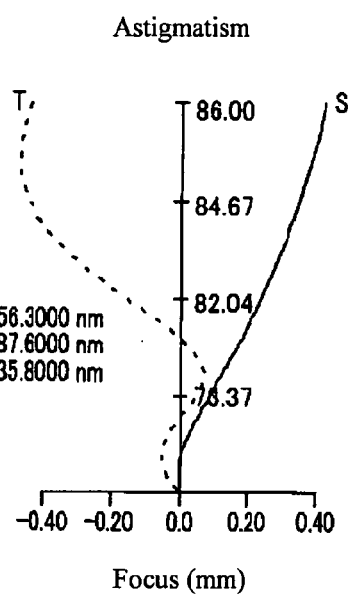
Figure 8C:
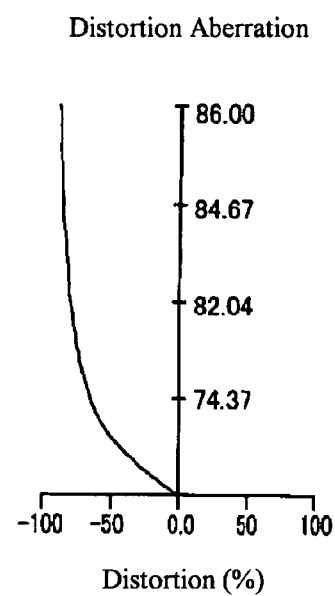
Figure 9A:
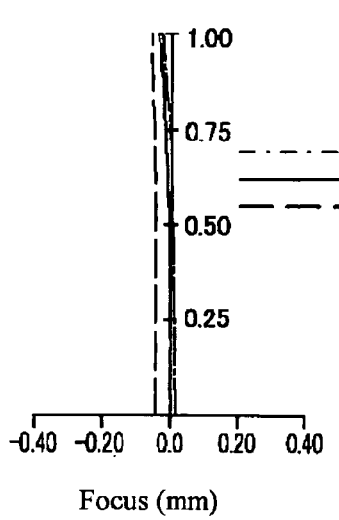
FIGS. 9a through 9c are aberration charts respectively showing a spherical aberration, an astigmatic aberration and a distortion aberration in the wide-angle optical system according to the embodiment 2.
Figure 9B:
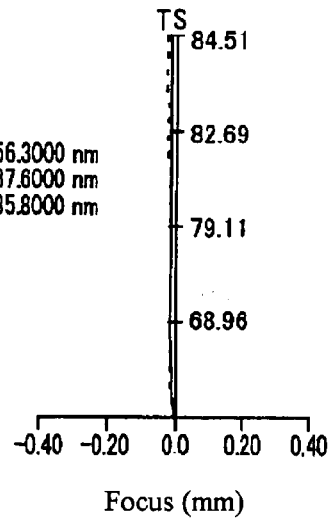
Figure 9C:
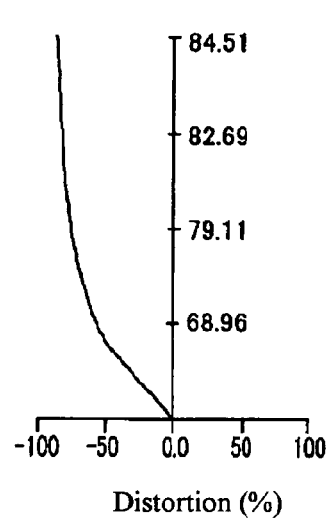

FIGS. 8a-8c show a spherical aberration, astigmatic aberration, and distortion aberration in the entire optical system according to the example 1 (the first through sixth lenses are combined) in the foregoing arrangement and constitution of the lenses.

In the drawings, horizontal axes in the spherical aberration and astigmatic aberration denote a shift of a focal point per mm, while a horizontal axis in the distortion aberration denotes a distortion amount by % relative to the whole. A vertical axis in the spherical aberration shows values standardized according to incident heights, while vertical axes in the astigmatic aberration and distortion aberration show angles of view (°). The drawing of the spherical aberration shows the aberrations in the case of using three lights having different wavelengths: red in a dashed line (wavelength 656.27 nm); yellow in a solid line (so-called d line; wavelength 587.56 nm), and blue in a broken line (wavelength 435.83 nm). In the drawing of the astigmatic aberration, reference symbols S and T respectively denote results in a sagittal (radial) surface and a tangential (meridional) surface.

Further, the drawings of the astigmatic aberration and distortion aberration show results in the case of using the yellow line (d line).

As is learnt from FIGS. 8a-8c, the wide-angle lens according to the example 1 shows a superior optical characteristic of substantially at most 0.10 mm in the spherical aberration and substantially at most 0.40 mm in the astigmatic aberration. Table 7 shows an F value, focal distance (unit: mm) and maximum angle of view 2θ (°) according to the example 1. It is learnt from Table 7 that the wide-angle optical system achieving such a short focal point as approximately 1.5 mm and 172° in the maximum angle of view is realized in the present invention.

EXAMPLE 2

Tables 3 and 4 respectively show construction data of the respective lenses according to the embodiment 2 (example 2). As is learnt from the tables, the object-side surface of the first lens (L1), both surfaces of the second lens (L2) and both surfaces of the sixth lens (L6) are aspherical in the example 2. Further, the second lens (L2) and the sixth lens (L6) are the plastic lenses in the present example.

TABLE 3

| lens surface | curvature radius (mm) | axial distance (mm) | refractive index | dispersion |
|---|---|---|---|---|
| r1* | −366.734 | 1.000 | 1.773 | 49.647 |
| r2 | 2.790 | 1.966 | | |
| r3* | −13.367 | 1.000 | 1.530 | 55.723 |
| r4* | 2.107 | 0.213 | | |
| r5 | 3.736 | 1.300 | 1.847 | 23.783 |
| r6 | −8.008 | 1.618 | | |
| r7 | ∞ | 0.100 | | |
| r8 | −135.281 | 1.000 | 1.847 | 23.783 |
| r9 | 2.170 | 2.149 | 1.773 | 49.647 |
| r10 | −9.078 | 0.100 | | |
| r11* | 6.082 | 1.883 | 1.530 | 55.723 |
| r12* | −3.864 | 4.147 | | |
| r13 | ∞ | | | |

TABLE 4

| lens sur-face | conical coeffi-cient | aspherical coefficient | | | |
|---|---|---|---|---|---|
| | | A | B | C | D |
| r1* | 0 | 1.30E−03 | −9.96E−06 | −2.82E−07 | 1.25E−08 |
| r3* | 0 | −1.18E−02 | −6.60E−04 | 1.61E−05 | 2.58E−05 |
| r4* | 0 | −2.08E−02 | −2.54E−03 | 3.95E−04 | −9.42E−05 |
| r11* | 0 | −2.49E−03 | 5.60E−04 | −7.34E−05 | 2.31E−06 |
| r12* | 0 | 3.19E−03 | 2.71E−04 | −6.22E−06 | −1.44E−06 |

EXAMPLE 3

Tables 5 and 6 respectively show construction data of the respective lenses according to the embodiment 3 (example 3). As is learnt from the tables, the both surfaces of the first lens (L1), both surfaces of the second lens (L2) and both surfaces of the sixth lens (L6) are aspherical in the example 3. Further, the second lens (L2) and the sixth lens (L6) are the plastic lenses in the present example.

TABLE 5

| lens surface | curvature radius (mm) | axial distance (mm) | refractive index | dispersion |
|---|---|---|---|---|
| r1* | −441.503 | 1.000 | 1.713 | 53.933 |
| r2* | 3.312 | 1.773 | | |
| r3* | −7.648 | 1.000 | 1.525 | 56.341 |
| r4* | 2.236 | 0.951 | | |
| r5 | −160.854 | 1.555 | 1.799 | 22.600 |
| r6 | −3.609 | 0.205 | | |
| r7 | ∞ | 2.119 | | |
| r8 | −17.823 | 0.800 | 1.799 | 22.600 |
| r9 | 3.000 | 2.726 | 1.755 | 51.570 |
| r10 | −4.519 | 0.100 | | |
| r11* | 11.738 | 1.512 | 1.525 | 56.341 |
| r12* | −7.399 | 4.246 | | |
| r13 | ∞ | | | |

TABLE 6

| lens surface | conical coefficient | aspherical coefficient | | | |
|---|---|---|---|---|---|
| | | A | B | C | D |
| r1* | 0 | 8.55E−04 | 5.10E−06 | 4.24E−15 | 5.47E−20 |
| r2* | 0 | −2.09E−03 | −1.23E−11 | 7.43E−18 | 0.00E+00 |
| r3* | 0 | −7.99E−03 | 1.66E−03 | −4.31E−05 | −5.86E−06 |
| r4* | 0 | −1.42E−02 | 1.67E−02 | −1.88E−03 | 0.00E+00 |
| r11* | 0 | −4.33E−03 | −2.35E−03 | 6.01E−04 | −2.82E−05 |
| r12* | 0 | −4.20E−03 | −8.36E−04 | 1.57E−04 | 1.50E−05 |

FIGS. 9a-9c and FIGS. 10a-10c respectively show spherical aberrations, astigmatic aberrations and distortion aberrations in the entire optical systems according to the second and third examples (the first through sixth lenses are combined) in the foregoing arrangement and constitution of the lenses. The lenses in the examples 2 and 3 show a superior optical characteristic of substantially at most 0.10 mm in the spherical aberration. Table 7 shows F values, focal distances (unit: mm) and maximum angles of view 2θ (°) according to the examples 2 and 3. It is learnt from Table 7 that the wide-angle optical system achieving a short focal point and a wide angle of view is realized in the same manner as in the example 1.

Table 8 shows values of the aforementioned conditional expressions (1)-(7) obtained in the examples 1-3. It is learnt that the desirable values mentioned earlier are obtained in any of the examples.

TABLE 7

| | F value | focal distance (mm) | maximum angle of view(°) |
|---|---|---|---|
| example 1 | 2.50 | 1.439 | 172.0 |
| example 2 | 2.47 | 1.690 | 169.0 |
| example 3 | 2.50 | 1.434 | 172.0 |

TABLE 8

| | (1) | (2) | (3) | (4) | (5) | (6) | (7) |
|---|---|---|---|---|---|---|---|
| example 1 | 17.946 | 12.502 | 748 | −0.329 | 53.9 | 1.713 | 1.189E−01 |
| example 2 | 16.404 | 9.751 | 750 | −0.486 | 49.6 | 1.773 | 7.166E−02 |
| example 3 | 17.941 | 12.542 | 748 | −0.311 | 53.9 | 1.713 | 1.275E−01 |
| (second surface) | — | — | — | — | — | — | 3.452E−02 |

The foregoing examples refer to the wide-angle optical system for forming the optical image of the photographic subject on the light-receiving surfaces of the imaging element that converts the optical image into the electrical signal, wherein the first lens having the negative optical power and the lens group having the positive optical power, which are serially disposed from the object side, are included. The first lens comprises at least one aspherical surface, and has the concave surface centered around the optical axis in the vicinity of the optical axis on the image-side surface thereof. Further, the conditional expressions (1) and (2) are satisfied.

In other words, the examples provide the negative-lead structure of the negative in which first lens group that is the closest to the object side has the negative optical power. Therefore, the light beam entering in a wide angle from the object side can be immediately moderated by the negative optical powers of the first lens group. Further, because the optical entire length can be shortened in the constitution of the negative lead, the entire size can be reduced in comparison to a positive-lead structure. Further, in the negative-lead structure, the error sensitivity can be prevented from increasing though the size is reduced. Therefore, a high optical performance can be achieved though conditions applied to a processing precision of the lens surface, a positional precision required when the lens is disposed in a lens tube, and the like, are moderated. To put it simply, the manufacturing process is facilitated.

Because the image-side surface of the first lens has the concave surface and the negative-lead structure is provided, the light beam entering from the object side in the wide angle can be more effectively moderated, which realizes the wide-angle optical system. Further, the effect obtained from the aspherical surface of the first lens serves, not only to control the various aberrations, but also to omit the lens required for correcting the aberrations. As a result, the downsizing is also realized as an additional advantage.

Because the conditional expressions (1) and (2) are satisfied, the optical powers of the respective lenses can be appropriate, and the wide-angle optical system in which the image-surface distortion and the spherical aberration are favorably corrected can be thereby obtained. Further, the optical entire length can be controlled, which realizes the downsizing.

In the examples described so far, the lens that is the closest to the object side is made of glass because the front surface of the lens (surface that is the closest to the object side) is often exposed particularly when the wide-angle optical system is installed in the in-vehicle camera 1, and the relevant lens surface and the lens having the relevant lens surface are required to have a tenacity, chemical resistance, waterproof property and the like. Therefore, the glass lens, which is superior in the foregoing characteristics, is used as the lens that is the closest to the object side.

Further, in the foregoing examples, the Knoop hardness of the first lens satisfies the conditional expression (3). Thereby, the hardness of the first lens is increased, which makes it difficult for the lens surface that is the closest to the object side to be damaged when the lens is used in the severe circumstances such as the in-vehicle use. As a result, the generation of the flare due to the flaws resulting from the damage and the deterioration of the photographing performance can be controlled.

Further, the foregoing examples satisfy the conditional expression (4). Thereby, the negative optical power of the first lens can be appropriate, and the off-axis light entering from the object side in the wide angle can be effectively moderated in the direction of the imaging element. As a result, it becomes unnecessary to increase the diameter of the first lens and the optical entire length, which enables the optical system to be downsized. Further, the image-surface distortion generated in the first lens can be effectively corrected.

Further, in the foregoing examples, the aspherical surface is provided for the object-side surface of the first lens, and the periphery of the aspherical surface has the relatively large positive optical power in comparison to the central part thereof. Thereby, the off-axis light entering the peripheral part of the object-side surface of the first lens in the wide angle can be effectively moderated in the direction of the imaging element, and the image-surface distortion and the astigmatic aberration can be reduced. Further, the wide-angle optical system can be realized.

In the foregoing examples, the glass lens is mainly used, and the plastic lens is additionally used. However, the present invention is not limited to thereto, and the at least one lens other than the first lens (L1) may be the plastic lens. In particular, because the optical powers of the lenses (L2-L6) other than the first lens (L1) are relatively weak, the plastic lens can be used without undermining the capability of favorably correcting the aberrations.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A fixed focal length optical system comprising from an object side:
   a first lens having a negative optical power, including at least an aspherical surface and having a concave surface centered around an optical axis in vicinity of the optical axis on an image-side surface; and
   a lens group having a positive optical power, wherein the following conditions are satisfied, $10\ \mathrm{mm} < T \times \sin\theta < 30\ \mathrm{mm}$, $7 < T/f_{tot} < 20$, where
T: optical entire length of entire system in mm
θ: half angle of view
$f_{tot}$: focal distance of entire system in mm.

2. An optical system according to claim 1, wherein the following condition is satisfied, $350 < Hk_1$ where
$Hk_1$: Knoop hardness of first lens.

3. An optical system according to claim 1, wherein the following condition is satisfied, $-0.6 < f_1/f_{tot} < -0.2$ where
$f_1$: focal distance of first lens in mm.

4. An optical system according to claim 1, wherein the first lens includes an aspherical surface as the object-side surface and a periphery of the aspherical surface has the positive optical power larger than that of a central part thereof.

5. An optical system according to claim 1, wherein the following condition is satisfied, $30 < v_1$ $1.6 < N_1$ where
$v_1$: dispersion of first lens
$N_1$: refractive index of first lens.

6. An imaging apparatus comprising:
   imaging elements for converting an optical image to an electrical signal; and
   a fixed focal length optical system that forms an optical image of the object on a receiving surface of said imaging elements,
   wherein said optical system includes from an object side:
   a first lens having a negative optical power, including at least an aspherical surface and having a concave surface centered around an optical axis in vicinity of the optical axis on an image-side surface; and
   a lens group having a positive optical power, wherein the following conditions are satisfied, $10\ \mathrm{mm} < T \times \sin\theta < 30\ \mathrm{mm}$, $7 < T/f_{tot} < 20$, where
T: optical entire length of entire system in mm
θ: half angle of view
$f_{tot}$: focal distance of entire system in mm.

7. An imaging apparatus according to claim 6, wherein the following condition is satisfied, $350 < Hk_1$ where
$Hk_1$: Knoop hardness of first lens.

8. An imaging apparatus according to claim 6, wherein the following condition is satisfied, $-0.6 < f_1/f_{tot} < -0.2$ where
$f_1$: focal distance of first lens in mm.

9. An imaging apparatus according to claim 6, wherein the first lens includes an aspherical surface as the object-side surface and a periphery of the aspherical surface has the positive optical power larger than that of a central part thereof.

10. An imaging apparatus according to claim 6, wherein the following condition is satisfied, $30 < v_1$ $1.6 < N_1$ where
$v_1$: dispersion of first lens
$N_1$: refractive index of first lens.

11. An imaging apparatus according to claim 6, wherein the following condition is satisfied, $3.0 \times 10^{-2} < D/f_{tot} < 3.0 \times 10^{-1}$ provided that, D: shift amount in mm of the aspherical surface from a spherical reference curved surface at a position through which a principal ray having an image height of 80% of a maximum image height is transmitted in the light-receiving surfaces of the imaging element, such shift amount being in a positive direction when it is in a direction in which a positive power is intensified.

12. An imaging apparatus according to claim 6, wherein the imaging apparatus is mounted at a predetermined position, and picks up an image of a peripheral region of the predetermined position.

13. A digital apparatus comprising an imaging unit which includes imaging elements for converting an optical image to an electrical signal, and a fixed focal length image pickup optical system that forms an optical image of the object on a receiving surface of said imaging elements, wherein said optical system includes from an object side:
a first lens having a negative optical power, including at least an aspherical surface and having a concave surface centered around an optical axis in vicinity of the optical axis on an image-side surface; and
a lens group having a positive optical power, wherein the following conditions are satisfied, $10 \text{ mm} < T \times \sin\theta < 30 \text{ mm},$ $7 < T/f_{tot} < 20,$ where
T: optical entire length of entire system in mm
θ: half angle of view
$f_{tot}$: focal distance of entire system in mm.

14. An imaging apparatus according to claim 6, further comprising a lens drive mechanism for focusing the optical system.

15. An imaging apparatus according to claim 6, further comprising a driving device for varying a direction of the optical axis of the optical system.

16. An imaging apparatus according to claim 6, further comprising an image processing device which is configured for processing said electrical signal from the imaging elements.

17. A digital apparatus according to claim 13, further comprising a lens drive mechanism for focusing the optical system.

18. A digital apparatus according to claim 13, further comprising a driving device for varying a direction of the optical axis of the optical system.

19. A digital apparatus according to claim 13, further comprising an image processing device which is configured for processing said electrical signal from the imaging elements.

* * * * *